United States Patent
Stark et al.

(10) Patent No.: US 6,192,769 B1
(45) Date of Patent: Feb. 27, 2001

(54) ADJUSTABLE GEARHEAD FOR A HEDGE TRIMMER ATTACHMENT

(75) Inventors: Thomas Stark, Waiblingen; Stephan Ostendorf, Weinstadt, both of (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/204,995

(22) Filed: Dec. 2, 1998

(30) Foreign Application Priority Data

Dec. 2, 1997 (DE) .............................................. 197 53 361

(51) Int. Cl.⁷ .......................... F16H 35/06; A10G 3/053; B26B 19/02
(52) U.S. Cl. .................................. 74/397; 74/25; 74/423; 56/233; 30/199; 30/208
(58) Field of Search ............................. 74/396, 397, 25, 74/423; 403/110; 30/216, 208, 369, 199; 56/233

(56) References Cited

U.S. PATENT DOCUMENTS

| 511,966 | * | 1/1894 | Olsen | 30/199 |
| 558,973 | * | 1/1896 | Milliken | 30/199 |
| 1,839,009 | * | 12/1931 | Bankson | 30/199 |
| 1,857,342 | * | 5/1932 | Albrecht | 30/199 |
| 1,937,586 | * | 12/1933 | Ortt | 30/199 |
| 5,079,841 | * | 1/1992 | Ohkanda et al. | 30/216 |
| 5,165,720 | * | 11/1992 | Hoblingre | 74/493 |

FOREIGN PATENT DOCUMENTS 4116885  12/1991 (DE) .

* cited by examiner

Primary Examiner—David A. Bucci
Assistant Examiner—William C Joyce
(74) Attorney, Agent, or Firm—Robert W. Becker & Associates

(57) ABSTRACT

A gearhead assembly between a drive shaft and an output shaft of a trimmer arranged parallel but staggered to one another, includes a bearing shaft extending perpendicularly between the drive shaft and the output shaft. The bearing shaft has a first end supported in the first housing part and a second end supported in the second housing. A central gear is mounted on the bearing shaft. A clamping device has a clamping shaft that has a first and a second opposed ends engaging the first and second housing parts. The second housing part together with the output shaft is pivotable about the bearing shaft relative to the first housing part in a plane parallel to the axial direction of the drive shaft. The bearing shaft is a hub, and the clamping shaft penetrates the hub.

17 Claims, 5 Drawing Sheets

ADJUSTABLE GEARHEAD FOR A HEDGE TRIMMER ATTACHMENT

BACKGROUND OF THE INVENTION

The present invention relates to a gearhead assembly of a drive shaft and a output shaft, especially of a hedge trimmer attachment for a trimmer, in which the output shaft is arranged in a second housing part and is positioned laterally displaced to the drive shaft positioned in a first housing part. A central gear is positioned between the drive shaft and the output shaft and is secured on a bearing shaft extending perpendicularly to the drive shaft and the output shaft. The bearing shaft is positioned with one end in the first housing part and with the other end in the second housing part. The second housing part together with the output shaft is pivotable in a plane parallel to the drive shaft relative to the first housing part about the bearing shaft.

Such a gear head assembly is known from German Patent Application 41 16 885. The drive shaft is supported in a first housing part which is connectable to the free end of the guide tube of a trimmer. At the first housing part a second housing part is rotatably secured which houses the output shaft. A central gear wheel is provided in the housing between the drive shaft and the output shaft which is secured on a transversely extending bearing shaft secured with one end in the first housing part and with the other end in the second housing part. The bearing shaft intercepts at a right angle the imaginary axes of rotation of the drive shaft and the output shaft whereby the second housing part with the output shaft is pivotable relative to the first housing part about the bearing shaft in a plane which extends parallel to the drive shaft. For securing respective pivot positions, a catch device is provided between the first housing part and the second housing part. The catch device is embodied as a toothed catch curve which cooperates with a matching multi-tooth catch lever. One problem of such a catch device is that play usually results between the catch lever and the catch curve which may result in shaking and knocking of the tool resulting from the drive moments acting on the gearhead. Especially in the case of an adjustable gearhead (in connection with a hedge trimmer attachment) arranged at the lower end of a long guide tube of a trimmer such shaking movements resulting from the drive moments are very disruptive and prevent a fatigue-free, precise guiding of the tool.

It is therefore an object of the present invention to embody a gearhead assembly of the aforementioned kind such that without great constructive expenditure a substantially play-free locking of the adjustable housing parts to one another is possible.

SUMMARY OF THE INVENTION

According to the present invention, the bearing shaft is embodied as a hub and the hub is penetrated by the clamping shaft of a clamping device, whereby the clamping shaft with its ends engages the two housing parts.

The arrangement of a clamping device coaxially to the pivot axis allows for a force-locking connection of the adjustable housing parts. This ensures that drive moments are securely supported, and vibrations, knocking, etc. of the tool are prevented. The clamping device may be adjustable such that for adjusting the clamping force can be significantly reduced or even canceled. When a predetermined clamping force is fixedly adjusted, it is selected such that it can be overcome upon movement of one housing part by the required adjusting force with acceptable force expenditure.

In order to ensure, manufacturing tolerances, a safe engagement of the drive shaft and the output shaft connected by the central gear, it is suggested that the central gear is comprised of two bevel gears that are connected to one another such that they rotate with one another whereby one bevel gear has an elongate hub extension which engages the other bevel gear so as to rotate therewith. One of the bevel gears is axially moveable relative to the other so that possible axis spacing tolerances can be easily compensated. Expediently, between the bevel gears a spring, especially a coil spring, is arranged with which in any pivot position, independent of possibly present manufacturing tolerances, a complete engagement of the central gear at the drive shaft and the output shaft is ensured.

In order to prevent an axial movement of the gearhead assembly for great force expenditure on the tool, in addition to the force-locking clamping by a clamping device which penetrates the bearing shaft of the central gear, a mechanical form-locking (positive-locking) catch device is provided between the housing parts. The catch device can be comprised of a catch curve having catch openings and of a catch pin that is radially moveable relative to the catch curve.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
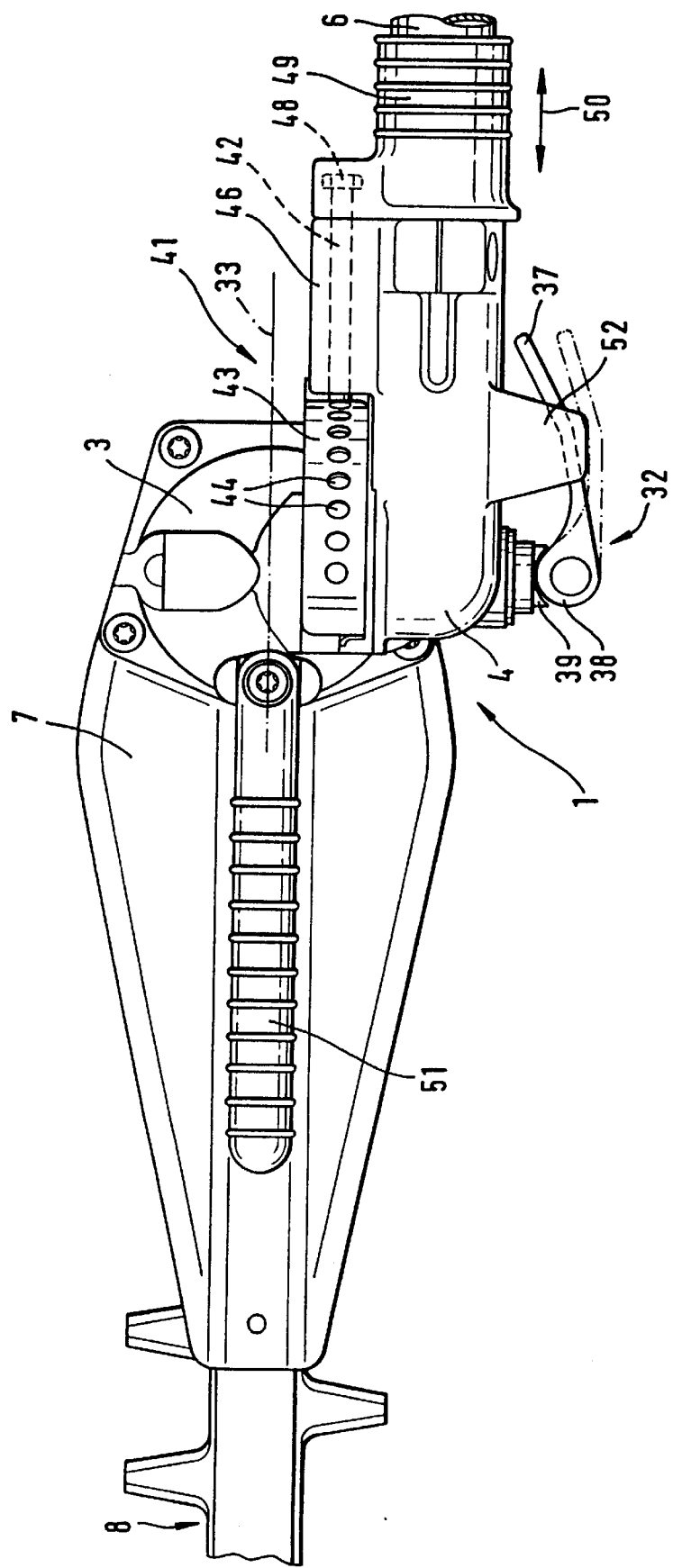
FIG. 1 is a plan view of the inventive gearhead assembly as a hedge trimmer attachment for a trimmer.

The present invention will now be described in detail with the aid of several specific embodiments according to FIGS. 1 through 6.

The gearhead 1 represented in the drawings serves as a connection between a drive shaft 2 and a output shaft 5 laterally staggered to the drive shaft 2. As can be seen especially in FIG. 3, the drive shaft 2 is supported in a first housing part 4 and the output shaft 5 is supported in a second housing part 3. In the shown embodiment of the gearhead assembly, the first housing part 4 is positioned on the lower end of a shaft tube 6 which may be the end of a guide tube of a known trimmer. The second housing part 3 is connected with the drive housing 7 of a blade bar 8 of a hedge trimming attachment. The axis 9 of the output shaft 5 extends perpendicularly to the plane defined by the blade bar 8.

Figure 2:
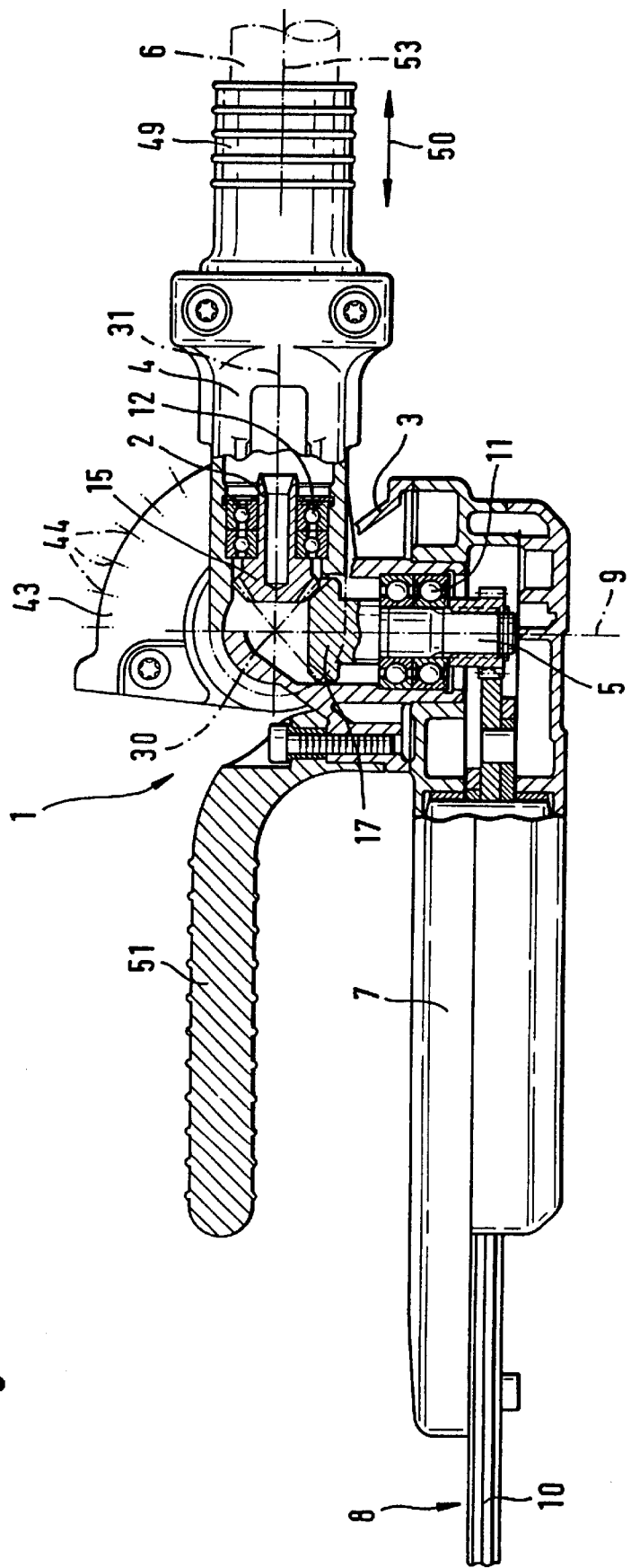
FIG. 2 is a side view of the gearhead assembly of FIG. 1, partially in section.
Figure 3:
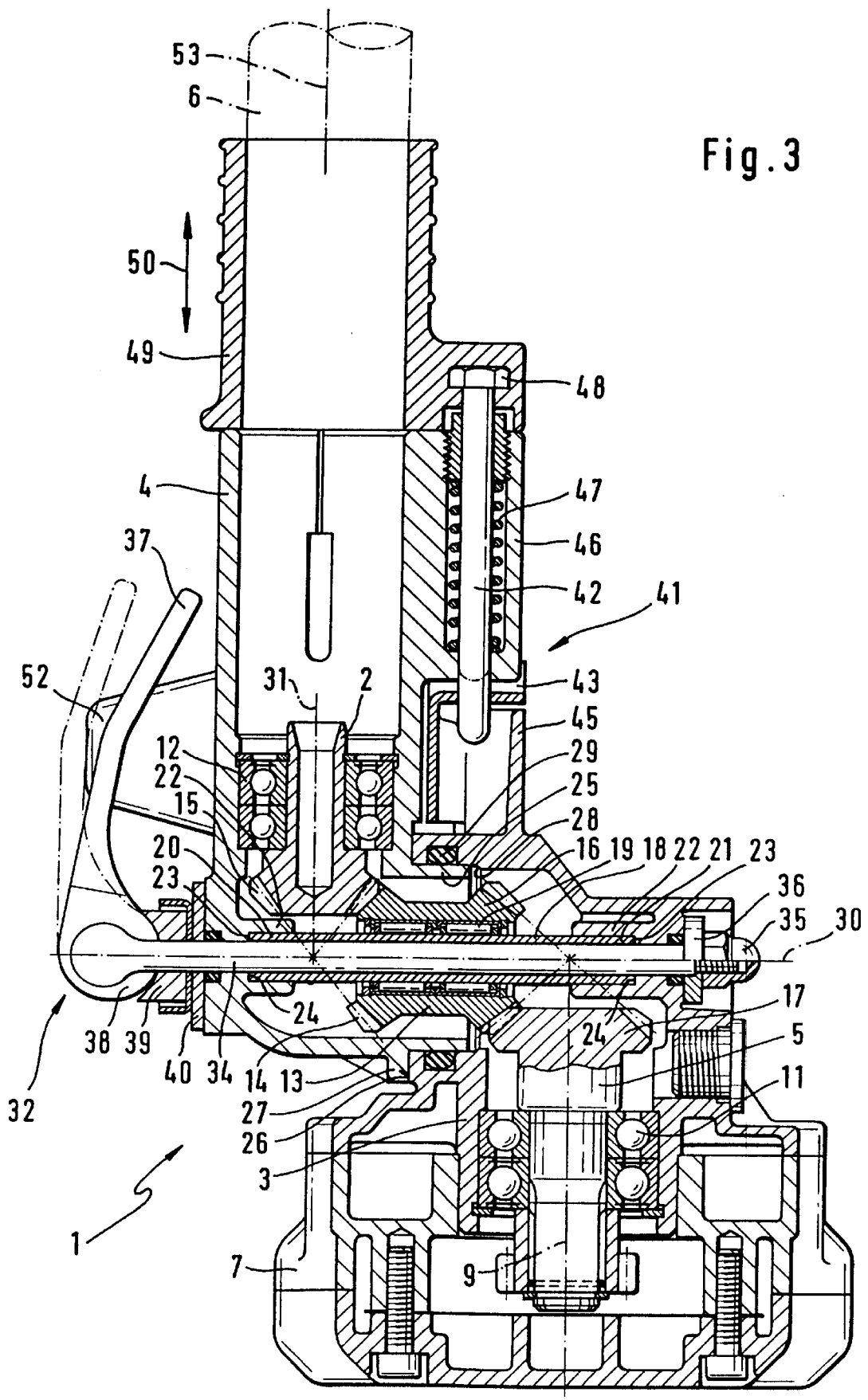
FIG. 3 shows a section of the gearhead assembly of FIG. 1 with a quick clamping device.

As can be seen especially in FIGS. 2 and 3, the drive shaft 2 and the output shaft 5 are rotatably supported by arrangement of respective roller bearings 11 and 12 in the respective housing parts. Between the drive shaft 2 and the output shaft 5 a central gear 13 is arranged which in the shown embodiment is a double bevel gear. One of the bevel gears 14 meshes with the drive bevel gear 15 of the drive shaft 2 while the other bevel gear 16 of the double bevel gear 13 meshes with the output bevel gear 17 of the output shaft 5.

Instead of the shown toothed gear arrangement, it is possible to employ other gear connections, for example, a frictional wheel connection.

The central gear 13 is rotatably supported on a bearing shaft 18. Preferably, the central gear 13 is arranged with needle bearings 19 on the bearing shaft 18. Inventively, the bearing shaft 18 is a hollow hub, preferably a bearing tube, which with its ends 20, 21 is received in bushing-like receiving elements 22 of the housing parts 3 and 4. The end faces 23 of the ends 20 and 21 rest with axial spacing to the bottom 24 of the receiving elements 22. Adjacent thereto an annular surface 26 of the second housing part 3 rests at an annular flange 27 of the first housing part 4. A cylindrical neck 25 of the housing part 4 engages a corresponding coaxial receiving element 28 of the second housing part 3. The neck 25 is coaxially arranged to the bearing tube 18. In the area of engagement of the cylindrical neck 25 and the receiving element 28 a seal 29 is provided which protects the two housing parts against introduction of dirt and loss of lubricant.

The first housing part 3 is pivotable about the bearing tube 18 and the cylindrical neck 25 relative to the first housing part 4 whereby the pivot axis 30 intercepts the axis of rotation 9 of the output shaft 5 as well as the axis of rotation 31 of the drive shaft 2 at a right angle. The output shaft 5 together with the second housing part 3 is pivotable in a plane 33 which is parallel to the drive shaft 2 relative to the first housing part 4 about the bearing tube 18.

Figure 4:
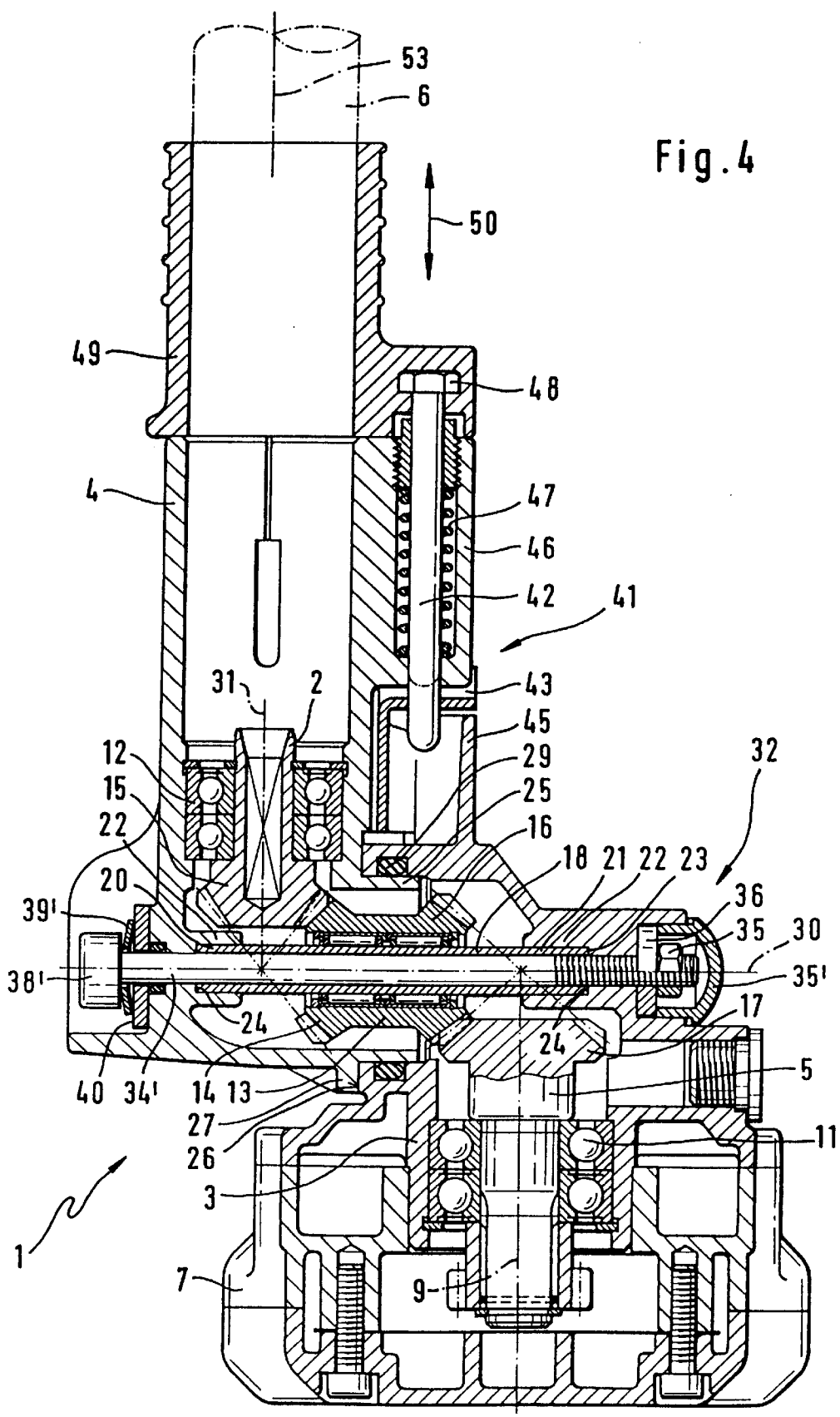
FIG. 4 shows a section of the gearhead assembly according to FIG. 3 with a clamping bolt.

For securing the two housing parts 3 and 4 relative to one another, a clamping device 32 is provided which, in the shown embodiment according to FIG. 3, is a quick clamping device, while in the embodiment according to FIG. 4 it has an adjustable clamping bolt. The clamping shaft 34 penetrates the bearing shaft 13 and with its end is secured in the housing parts 3 and 4. On one end of the clamping shaft 34 a clamping nut 35 is threaded which is supported by a pressure disk 36 externally at the housing part 3. The other end of the clamping shaft 34 supports a clamping lever 37 having an eccentric clamping head 38 which is supported in a ball socket 39 penetrated by the clamping shaft 34. The ball socket 39 is supported with interposition of a pressure disk 40 externally at the first housing part 4.

In the embodiment according to FIG. 4 a clamping bolt 34' is provided instead of the quick clamping device which the bolt 34' is fixedly clamped in position. One end is embodied as a head 38' and is preferably supported by a spring element 39' on the pressure disk 40. The other end with the clamping nut 35 is supported on the pressure disk 36. For applying the desired clamping force, the clamping nut 35 is tightened so that the applied clamping force of desired magnitude will clamp the housing parts 3 and 4 in a force-locking manner to one another. The clamping force is selected such that it can be overcome by a positional change of the housing parts to one another. The plate spring 39', expediently positioned between the head 38' and the pressure disk 40, ensures a light adjustment with substantially unchanged axial clamping force. The clamping nut 35 can be covered for securing purposes by a housing cover 35'.

In addition to the clamping device a catch device is positioned between the first housing part 4 and the second housing part 3. This catch device is comprised of a catch pin 42 and a catch curve 43 having catch openings 44. The catch curve 43 is comprised, as can be seen in FIG. 1, of a piece of sheet metal that is curved in the shape of a quarter circle and is secured approximately coaxially to the receiving element 28 at a securing flange 45 of the second housing part 3. The catch sheet metal piece can be manufactured easily by stamping. The catch openings 44 are arranged equidistantly in the circumferential direction (FIG. 1).

The catch pin 42 is secured in a housing extension 46 of the first housing part 4 which covers the catch curve 43 and is forceloaded by a spring, especially a coil spring 47, into its catch position shown in FIG. 3. The head 48 of the catch pin 42 extends from the housing extension 46 at a side facing away from the catch curve and is fixedly connected to an actuator sleeve 49 which is axially moveably secured (double arrow 50) on the shaft tube 6. As can be seen in FIGS. 1 and 2, at the second housing part a grip 51 is secured which is positioned at the side facing the first housing part 4 substantially parallel to the tool, i.e., the blade bar 8. Any other arrangement of the grip 51 may be expedient. The clamping lever 37 is positioned in the longitudinal direction of the blade bar 8 behind a protective flange 52 so that a safety means is provided against accidental release of the clamping lever.

The catch pin 42 can be embodied with a tapered, preferably conical, head which engages without play a matching catch opening.

As a function of the desired angular position of the blade bar 8 to the longitudinal axis 53 of the guide tube 6, the operator will adjust the device. First, the clamping lever 37 is released so that the frictional connection between the first and the second housing parts 3 and 4 is canceled. Thereafter, the operator with his free hand will grip the longitudinal grip 51 and pull with the other hand the actuator sleeve 49 in the longitudinal direction of the shaft tube 6 in the upper direction so that the catch pin 42 will be lifted out of the corresponding catch opening 44. The operator can then adjust the blade bar relative to the shaft tube 6 about an angular distance of 90°. In FIG. 2 one end position is shown in which the longitudinal axis 53 of the shaft tube 6 is approximately parallel to the blade bar 8. In FIG. 3, the other end position of the pivot range is shown in which the longitudinal axis 53 of the shaft tube 6 is approximately perpendicular to the blade bar 8. In the desired pivot position of the blade bar, the operator will release the actuator sleeve 49. The force of the coil spring 47 will force the catch pin 42 into the neighboring catch opening 44. The catch device 41 serves only as an initial alignment means for of the parts relative to one another. A play-free locking of the housing parts relative to one another is not required so that the catch device 41 can be relatively simple and robust. The final securing of the housing parts 3 and 4 of the adjusted gearhead 1 is carried out by closing the quick clamping device 32 which results in a force-locking connection between the annular surface 26 and the annular flange 27. The bearing tube 18 can be dimensioned with regard to its length such that for a closed clamping device 32 it is substantially free of axial forces so that the bearing tube 18 serves only as a guide for the central gear 13 and is not subjected to mechanical or dynamic loading.

Figure 5:
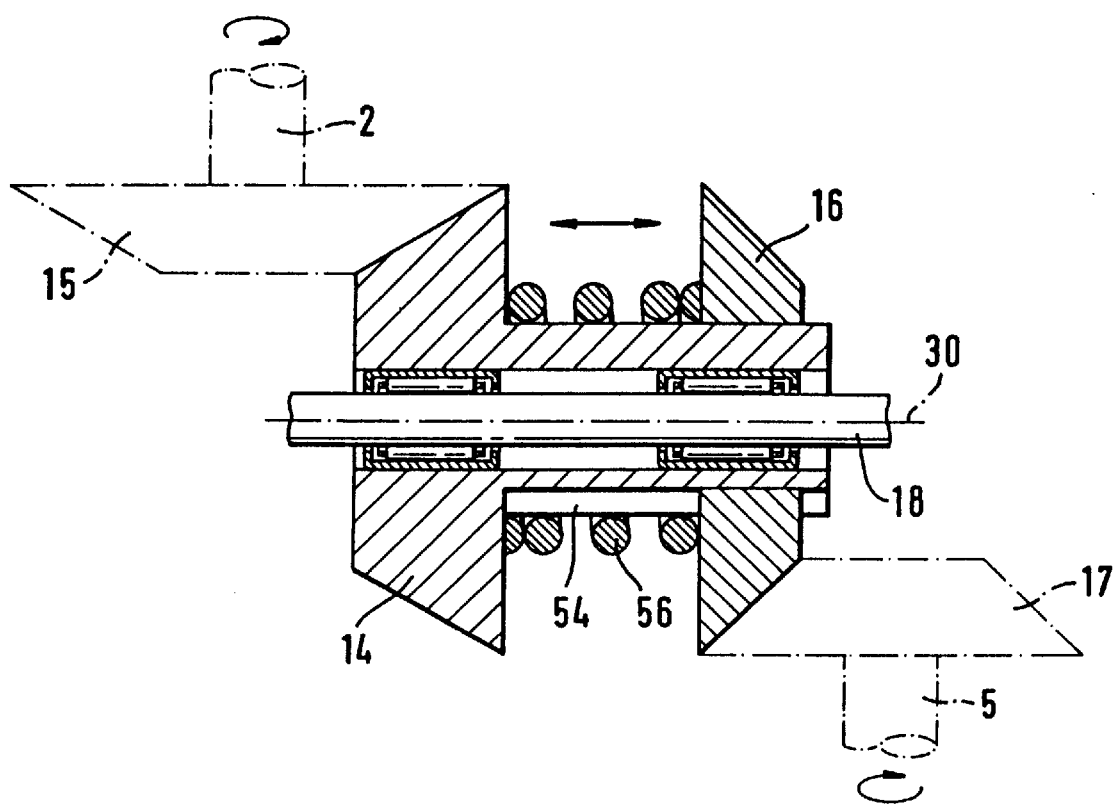
FIG. 5 shows a section of the central gear.
Figure 6:
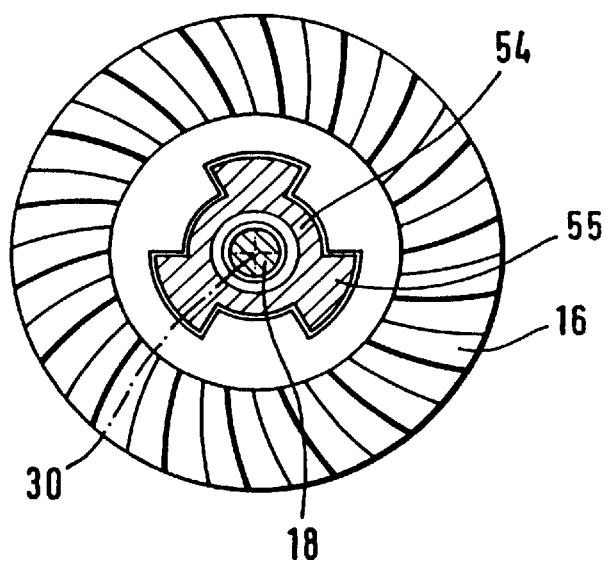
FIG. 6 shows an end view of the central gear according to FIG. 5.

In order to be able to provide force locking in any pivot position of the gearhead assembly between the drive gearwheel 15 and the output gear wheel 17, minimal manufacturing tolerances must be present. Advantageously, for compensating possibly occurring play, the central gear 13 is comprised of two individual bevel gears which are connected to one another so as to rotate with one another whereby, however, one bevel gear 16 can be axially moved relative to the other bevel gear 14. For this purpose, one of the bevel gears 14 has an elongate hub extension 54 which is engaged at the center of the other bevel gear 16 so as to rotate therewith. As can be seen in FIG. 5, a splint shaft connection 55 is selected in order to provide a rotationally fixed connection between the hub extension 54 of the bevel gear 14 and the bevel gear 16 which is axially moveably positioned on the hub extension 54. In order to ensure that the two bevel gears 14, 16 always are in full tooth engagement at the drive shaft or output shaft, the bevel gears 14 and 16 have positioned thereat a spring 56, embodied preferably as a coil spring surrounding the elongate hub extension 54 that forces the bevel gears 14, 16 apart.

The specification incorporates by reference the disclosure of German priority document 197 53 361.2 of Dec. 2, 1997.

The present invention is, of course, in no way restricted to the specific disclosure of the specification and drawings, but also encompasses any modifications within the scope of the appended claims.

What is claimed is:

1. A hedge trimmer comprising:

a housing having a first housing part (4) and a second housing part (3);

a drive shaft (2) mounted in said first housing part (4);

an output shaft (5) mounted in said second housing part (3);

said drive shaft (2) and said output shaft (5) positioned parallel to one another and staggered relative to one another in a respective axial direction of said drive shaft (2) and said output shaft (5);

a bearing shaft (18) supported in said housing and extending perpendicularly between said drive shaft (2) and said output shaft (5);

a central gear (13) mounted on said bearing shaft (18), said central gear (13) comprised of first and second bevel gears (14, 16) connected to one another so as to rotate with one another;

a clamping device (32) having a clamping shaft (34);

said clamping shaft (34) having first and second opposed ends engaging said first and second housing parts (4, 3), respectively;

wherein said second housing part (3) together with said output shaft (5) is pivotable about said bearing shaft (18) relative to said first housing part (4) in a plane parallel to the axial direction of said drive shaft (2);

wherein said bearing shaft (18) is a tube;

wherein said clamping shaft (34) penetrates said tube.

2. A hedge trimmer according to claim 1, wherein said central gear (13) is freely rotatably mounted on said bearing shaft (18).

3. A hedge trimmer according to claim 1, wherein said first bevel gear (14) has an elongate hub extension (54) engaging said second bevel gear (16) to thereby connect said first and second bevel gears (14, 16) so as to rotate with one another.

4. A hedge trimmer according to claim 1, wherein said first and second bevel gears (14, 16) are axially slidable relative to one another.

5. A hedge trimmer according to claim 4, comprising a spring (56) positioned between said first and second bevel gears (14, 16).

6. A hedge trimmer according to claim 5, wherein said spring is a coil spring (56).

7. A hedge trimmer according to claim 1, wherein said clamping device (32) has a clamping lever (37) and a socket (39), wherein said socket (39) is arranged at said first opposed end of said clamping shaft (34) and is penetrated by said clamping shaft (34), wherein said clamping lever (37) is connected to said first opposed end of said clamping shaft and has an eccentric clamping head (38) received in said socket (39).

8. A hedge trimmer according to claim 1, wherein said clamping lever (37) in a clamping position thereof is positioned behind a protective flange (52) of said first housing part (4).

9. A hedge trimmer according to claim 1, wherein said clamping shaft (34) is comprised of a clamping bolt (34') and a clamping nut (35) connect to said second opposed end (21).

10. A hedge trimmer according to claim 9, wherein said clamping device (32) further comprises a spring element (39'), wherein said bolt (34) has a bolt head (38') at said first opposed end and wherein said spring element (39') is arranged between said bolt head (38') and said first housing part (4).

11. A hedge trimmer according to claim 10, further comprising a catch device (41) arranged between said first and second housing parts (3, 4).

12. A hedge trimmer according to claim 11, wherein said catch device (41) includes a catch curve (43) having catch openings (44) and further includes a catch pin (42) radially moveable relative to said catch curve (43).

13. A hedge trimmer according to claim 12, wherein said catch pin (42) is arranged at said first housing part (4) so as to be slidable parallel to a shaft tube (6) receiving said drive shaft (2).

14. A hedge trimmer according to claim 13, wherein said catch device (41) further comprises an actuator sleeve (49) for slidably mounting on said shaft tube (6), wherein said catch pin (42) is fastened to said actuator sleeve (49).

15. A hedge trimmer according to claim 1, wherein said second housing part (3) has a grip (51).

16. A hedge trimmer according to claim 15, wherein said grip (51) is positioned on a side of said second housing part (3) facing said first housing part (4).

17. A hedge trimmer according to claim 1, wherein said bearing shaft (18) has a first end (20) supported in said first housing part (4) and a second end (21) supported in said second housing part (3).

* * * * *